US009334967B2

(12) United States Patent
Larsen et al.

(10) Patent No.: US 9,334,967 B2
(45) Date of Patent: May 10, 2016

(54) AXIAL VALVE (71) Applicant: Danfoss A/S, Nordborg (DK)

(72) Inventors: Sigurd Larsen, Flensburg (DE); Kurt Harck, Soenderborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 14/394,319

(22) PCT Filed: Apr. 16, 2013

(86) PCT No.: PCT/EP2013/001120
§ 371 (c)(1),
(2) Date: Oct. 14, 2014

(87) PCT Pub. No.: WO2013/156144
PCT Pub. Date: Oct. 24, 2013

(65) Prior Publication Data
US 2015/0069279 A1   Mar. 12, 2015

(30) Foreign Application Priority Data

Apr. 16, 2012 (EP) .................................. 12002645

(51) Int. Cl.
*F16K 3/26* (2006.01)
*F16K 1/12* (2006.01)
(Continued)

(52) U.S. Cl.
CPC .................. *F16K 3/265* (2013.01); *F16K 1/123* (2013.01); *F16K 3/246* (2013.01); *F16K 3/262* (2013.01); *F16K 31/041* (2013.01); *F25B 41/04* (2013.01)

(58) Field of Classification Search
CPC ......... F16K 3/265; F16K 1/123; F16K 3/246; F16K 3/262; F16K 31/041; F25B 41/04
See application file for complete search history.

(56) References Cited

U.S. PATENT DOCUMENTS 5,351,934 A * 10/1994 Jensen .................... F16K 1/123
251/129.1
6,802,488 B1   10/2004 Patterson
(Continued)

FOREIGN PATENT DOCUMENTS

DE       896 140        11/1953
DE       3519034 A1 *   11/1986  .............. F16K 1/123
(Continued)

OTHER PUBLICATIONS

European Search Report Serial No. EP12002645 dated Aug. 7, 2012.
(Continued)

*Primary Examiner* — Jessica Cahill
(74) *Attorney, Agent, or Firm* — McCormick, Paulding & Huber LLP (57) ABSTRACT The invention relates to an axial valve comprising an actuator (15) and a center tube (19). The actuator comprises a stationary element (16) and a closing element (17), and the center tube (19) is placed axially in relation to an axial extension of the stationary element (16). The center tube (19) is in a fixed position relative to the stationary element (16). Fluid, such as refrigerant, is intended for flowing through the valve and through the center tube. The center tube (19) comprises orifices (22) for fluid passage. The closing element (17) is placed axially to an axial extension of the center tube (19) and is movable axially along the center tube between a first position, where the closing element closes the orifices (22) of the center tube, thereby not allowing fluid to pass the orifices, and a second position, where the orifices (22) are open, thereby allowing fluid to pass the orifices.

18 Claims, 6 Drawing Sheets (51) Int. Cl.
*F16K 3/24* (2006.01)
*F16K 31/04* (2006.01)
*F25B 41/04* (2006.01)

(56) References Cited

U.S. PATENT DOCUMENTS

| | | | |
|---|---|---|---|
| 7,322,560 B2* | 1/2008 | Gauss | F16K 31/074 251/129.11 |
| 2003/0146402 A1 | 8/2003 | Hirota et al. | |
| 2005/0155652 A1* | 7/2005 | Morrow | F16K 15/025 137/508 |
| 2007/0284002 A1* | 12/2007 | Hartman | F16K 1/123 137/219 |

FOREIGN PATENT DOCUMENTS

| | | | | |
|---|---|---|---|---|
| DE | 10 2010 048 901 A1 | 4/2012 | | |
| EP | 1 255 066 A2 | 11/2002 | | |
| EP | 1 403 574 A1 | 3/2004 | | |
| EP | 2177796 A2 * | 4/2010 | | F16K 1/12 |
| FR | 1 280 679 | 1/1962 | | |
| TW | M253458 | 12/2004 | | |
| WO | WO 2012108583 A1 * | 8/2012 | | F16K 1/123 |

OTHER PUBLICATIONS

International Search Report for PCT Serial No. PCT/EP2013/001120 dated Jul. 18, 2013.

* cited by examiner

AXIAL VALVE

CROSS-REFERENCE TO RELATED APPLICATION

This application is entitled to the benefit of and incorporates by reference subject matter disclosed in International Patent Application No. PCT/EP2013/001120 filed on Apr. 16, 2013 and European Patent Application 12002645.5 filed Apr. 16, 2012.

BACKGROUND

1. Technical Field

This invention relates to axial valves, that is, valves with axially moving valve elements along a longitudinal extension of the valve, the longitudinal extension being along a prevailing flow direction of fluid through the valve. The invention relates more particularly to axial electronic valves in vapor compression systems such as refrigeration systems. The invention also relates to a vapor compression system with such valve.

2. Background Art

Axial valves are well known for flow control. Axial valves have a passageway that is substantially parallel to the fluid flow path. Axial valves typically comprise an actuator, and the actuator can be a stepper motor with a stator and a rotor and a stem.

Known axial valves are commonly rather complex. The rotational movement of the rotor is transformed to a linear moving stem, the stem in one end has a head. When the stem is moved in one direction the head acts with a valve seat to close the valve orifice for fluid passage, and when the stem is moved in the opposite direction, the head is moved away from the valve seat to open for fluid passage through the orifice. The axial valve has many parts making the assembly complicated and requiring critical process control to reduce rejects. The many parts of the valve increase the risk of failure of parts of the valve due to productions failures or due to malfunction between the many parts during operation of the valve.

Furthermore, the forces acting from the flow of fluid, when the valve is operating, can be significant and may hamper movement of the movable parts. The flow-forces can thereby act as a barrier for reaching high capacities or high differential pressures between inlet and outlet of the valve.

SUMMARY

The object of the present invention is to make a simple, cost-effective axial electronic expansion valve or suction pressure regulation valve or other type of valve in a vapor compression cycle, with low complexity and few parts.

The axial valve of the present invention is a bi-flow valve, that is a valve where fluid may flow either one way or the opposite way through the valve, comprising an actuator, and the actuator comprises a stationary element and a closing element, the closing element can be a rotor or a piston. The valve having a substantially longitudinal extension along a prevailing flow direction of fluid through the valve, the valve comprises a center tube placed axially in relation to an axial extension of the stationary element. The center tube is in a fixed position relative to the stationary element and placed parallel to the longitudinal extension of the valve, and fluid intended for flowing through the valve, through the center tube, said center tube or said closing element comprises one or more orifices for fluid passage, the closing element being placed axially to an axial extension of the center tube and at least partly extending along a sidewall of the center tube, the closing element being movable axially along the center tube between a first position, where the closing element closes the one or more orifices, thereby not allowing fluid to pass the orifices, and a second position where the one or more orifices are open, thus allowing fluid to pass the orifices.

In the preferred embodiment the actuator is a stepper motor and the stationary element is a stator, the closing element then preferable is a rotor with a screw thread connection cooperating with another screw thread to move the closing element between a closed and a fully open position.

In another embodiment the closing element could be a piston pushed by a rotor to close the orifices and when opening the orifices the rotor is moving back and a biasing means pushes the closing element back to a open position or visa versa.

Alternatively the actuator can be a solenoid moving the closing element by electromagnetic forces without a thread, then for instance when the solenoid is turned on the closing element moves to a fully open position and when the solenoid is turned off biasing means, typically a spring, pushes the closing element to a closed position or visa versa.

The actuator can also be any other kind of electronic motor able to move the closing element.

The movement of the closing element to directly open and close the orifices is not known in prior art, where the rotational movement of a rotor is transformed to a stem or similar. In the present invention, when the actuator is a stepper motor the closing element is both rotating and moving linearly in the valve, and therefore transforming the rotational movement to a stem is not needed.

The closing element itself is closing or opening the fluid passage through the orifices in the center tube by moving in a first direction towards a first position or moving in a second direction towards the second position. The closing element is the only moving part in the valve. Thereby, the valve is made simple and cost-effective with little complexity. The closing element is preferable magnetically actuated.

In a preferred embodiment, the center tube is fixed to the stationary element, and the axial extension of the center tube is aligned with an axis of the stationary element, and the center tube is supported from the stationary element making the valve easy to assemble and with little risk of malfunction because of misalignment between the center tube and the stationary element.

Preferably, the closing element is positioned along a sidewall of the center tube, wherein the closing element is movably guided by the center tube, and wherein the rotor is supported from the center tube. The closing element is the only moving part in the valve and supported from the center tube make the valve robust reducing the risk of defects.

The orifices of the center tube, in the preferred embodiment, are positioned along a sidewall of the center tube. When the closing element is not in the first position, and the orifices are not closed, fluid is allowed to pass from or to the inside of the center tube through the orifices in the side wall, depending on the flow direction. Having the orifices in the side wall of the center tube, the pressure differential acting over the center tube will act perpendicular to the rotation axis, the pressure differential thereby being equalizing, thus minimizing the influence of the flow forces on the movement of the closing element. A first end of the center tube rests on an end cap, if the center tube is open in the first end. The end cap closes and seals the first end of the center tube, forcing the fluid to pass through the orifices in the side wall.

In an alternative embodiment, the center tube does not have any orifices in the sidewall. Instead, the orifices are placed in the first end of the center tube, so that the first end of the center tube comprises one or more orifices. In this embodiment, the center tube does not rest on an end cap, but an end cap blocks direct axial passage of fluid, thereby forcing the fluid to pass to or from the interior to the exterior of the center tube in a direction obliquely to, possibly perpendicular to, the axial axis of the center tube, depending on the flow direction of fluid. The pressure differential acting over the valve will act obliquely to, possibly perpendicular to, the axial extension of the center tube.

In a preferred embodiment, the closing element is tubular, and an axial extension of the closing element extends parallel to the axial extension of the center tube, and the closing element extends along a sidewall of the center tube.

In one embodiment, the closing element extends along an outer surface of the sidewall of the center tube so that the closing element extends outside the center tube. Thereby the closing element is placed between the stationary element and the center tube making the closing element well supported on both sides of the closing element.

In an alternative embodiment, the closing element extends along an inner surface of the sidewall of the center tube so that the closing element extends inside the center tube. Thereby in this alternative embodiment the stationary element and the closing element is separated by the center tube.

In the embodiment, where the center tube is provided with orifices along the sidewall of the center tube, a sealing may be provided between the sidewall surface of the center tube and the sidewall surface of the closing element facing each other. The sealing may be a gasket placed between the closing element and the center tube. When the closing element is in the first position, the sealing makes a tight seal. Having the orifices in the sidewall of the center tube allows the closing element to close the orifices, making the valve simple and effective.

Furthermore, the orifices allowing the fluid flowing through the sidewall, balances the valve in such a manner, that any pressure differential acting over the valve will act obliquely, preferably perpendicular, to the rotational axis, preferably along the full circumference of the sidewalls, the pressure differential thereby being equalized. The forces from the pressure differential acting obliquely to the rotational axis of the valve body makes it possible to have only one level of gearing when moving the valve body, and the demand for actuator force is kept low, even at high differential pressures, making the construction simple and inexpensive because no additional gearing is needed.

Preferably, several orifices are placed in a symmetric manner in the sidewall of the center tube. All the orifices may have the same shape, rectangular or alternatively the orifices may have different shapes, like triangles, circles, drop-shaped or other geometric shapes allowing better flow control. The size of each of the orifices can also vary as well as the location in the sidewall, for instance the distance from the orifice to the end of the center tube, can be different.

The valve according to the invention makes it possible to implement a NO (normally open) or NC (normally closed) function. Incorporating a NO (normally open) or NC (normally closed) function may be established by implementing a biasing element such as a spiral spring, acting with a constant torque on the closing element. The biasing element will make the closing element return to its closed or open position, if an actuating force from the motor is lees than the force from the biasing element, such as if the motor looses power. When the motor is to actuate the closing element, the motor needs to provide a force with a constant force apart from the force for actuating the closing element, in order to balance out the torque from the spring. Integration of critical tolerances and geometry in the parts makes assembly and production independent of critical process control, thus reducing rejects.

The valve is an axial bi-flow valve and can for instance be used for commercial refrigeration systems in the range of 12.5-150 Ton of refrigeration.

DETAILED DESCRIPTION

Figure 1:
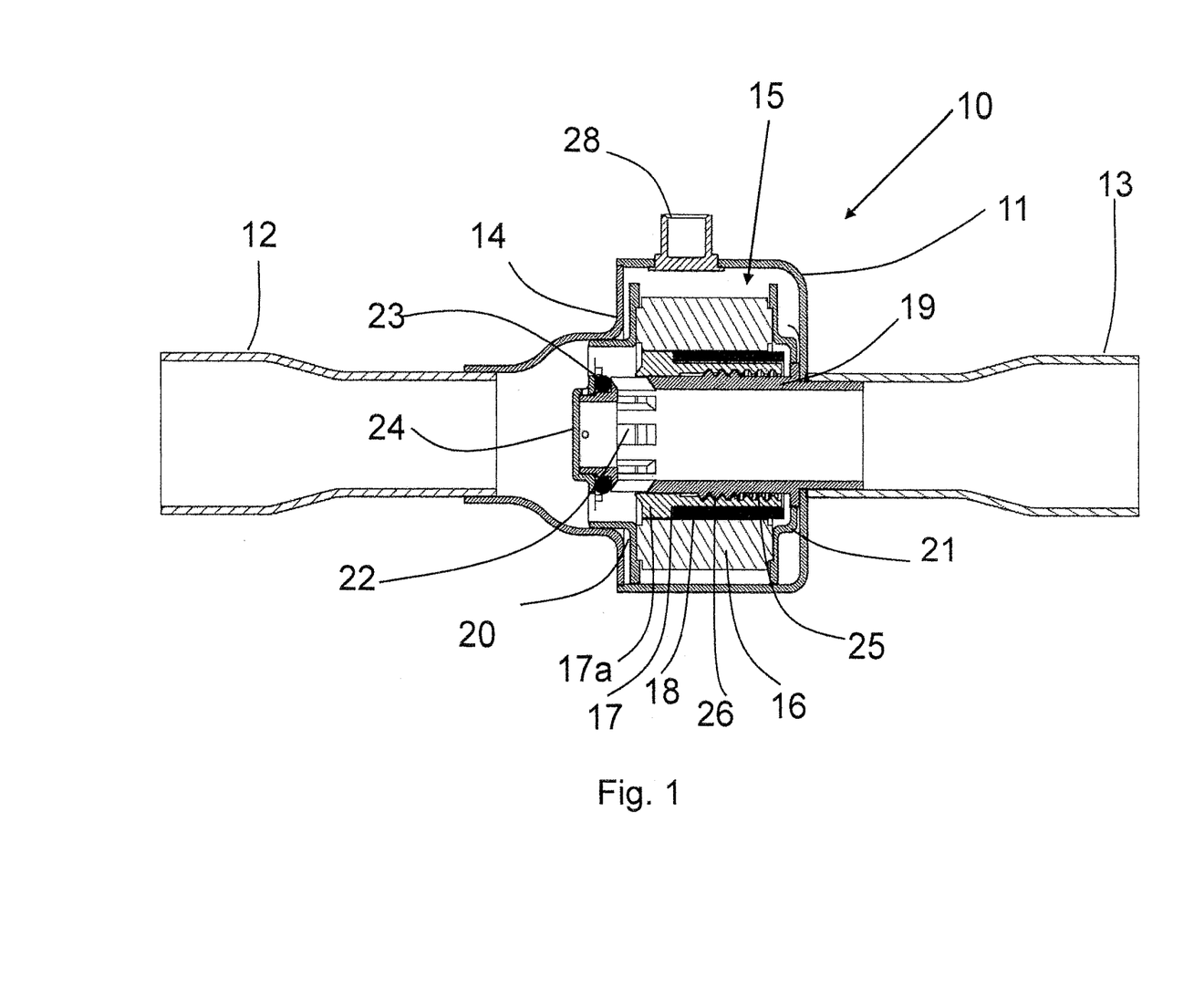
FIG. 1 is a cross sectional view of a valve in open position in accordance with the present invention.

FIG. 1 shows and embodiment of a valve 10 with a housing 11 and connecting tubes 12, 13 leading to the valve. The housing comprises a casing 14. In the housing 11, an electrical stepper motor 15 is provided, the actuator 15 is a stepper motor comprising a stationary element 16 which is a motor rotor and a closing element 17. The closing element 17 comprises a closing element core 17a and a magnet 18.

The closing element 17 forms a hollow cavity, and inside the hollow cavity is a center tube 19. The center tube 19 is fixed to the stationary element 16 by a first flange 20 and a second flange 21. The center tube 19 comprises orifices 22 in the sidewall of the center tube for allowing fluid flow therethrough. A gasket 23 is provided for sealing off the flow of fluid, when the closing element 17 is in a closed position (see FIG. 2). The first flange 20 comprises an end cap 24, sealing off a top end 29 of the center tube 19. A connection 28 is used for wiring (wires not shown) to the actuator 15, the opening in the connection 28 being sealed by, e.g., a glass seal. The valve 10 is a bi-flow valve, that is, flow in both directions through the valve is possible.

FIG. 1 shows the valve in an operational mode in which the closing element 17 is in a position allowing flow of fluid, such as a refrigerant, through the orifices 22. The fluid flows through the center tube 19. The closing element 17 of the stepper motor 10 is hollow, with an internal screw thread 25 provided along a part of an inner circumference of the closing element. The internal screw thread is cooperating with an external screw thread 26 on part of an outer surface of the center tube 19.

When the closing element 17 is rotated by applying an electrical current to the stationary element 16, the rotation of the closing element 17 is transformed into a linear movement of the closing element 17, due to the cooperating internal screw thread 25 of the closing element 17 and external screw thread 26 of the center tube 19. When moving the closing element backwards (to the right in FIG. 1), the orifices 22 in the center tube 19 are exposed more and more, and the flow of fluid is increased incrementally. When moving the closing element 17 forwards (to the left in FIG. 1), the orifices 22 are closed more and more, and the flow of fluid is decreased incrementally.

Figure 2:
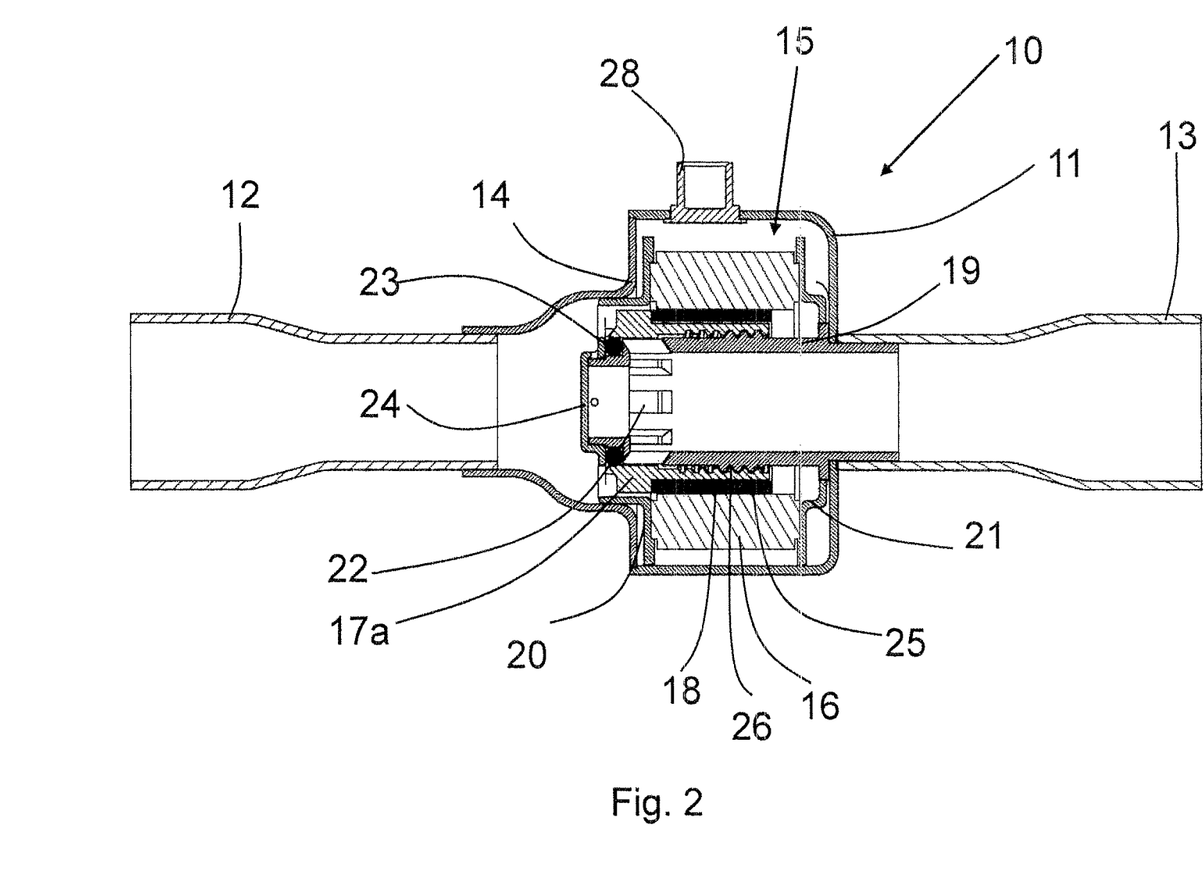
FIG. 2 is a cross sectional view of the valve in FIG. 1 in closed position.

FIG. 2 shows the valve in a fully closed position, where the closing element has been moved fully to a first end 29 of the center tube 19 (fully to the left in FIG. 1). In the fully closed position, the closing element 17 acts as a seal, closing the orifices, and with part of an inner circumference of the closing element being in abutment with the gasket 23, thereby shutting off the valve completely.

Figure 3A:
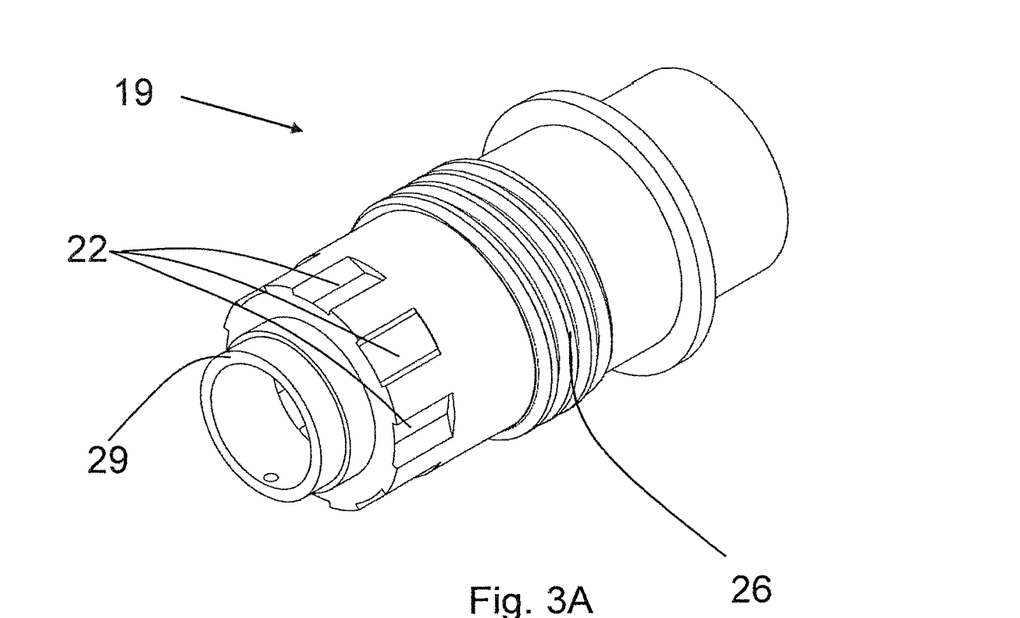
FIG. 3A is a 3D view of the center tube of the valve in FIG. 1.
Figure 3B:
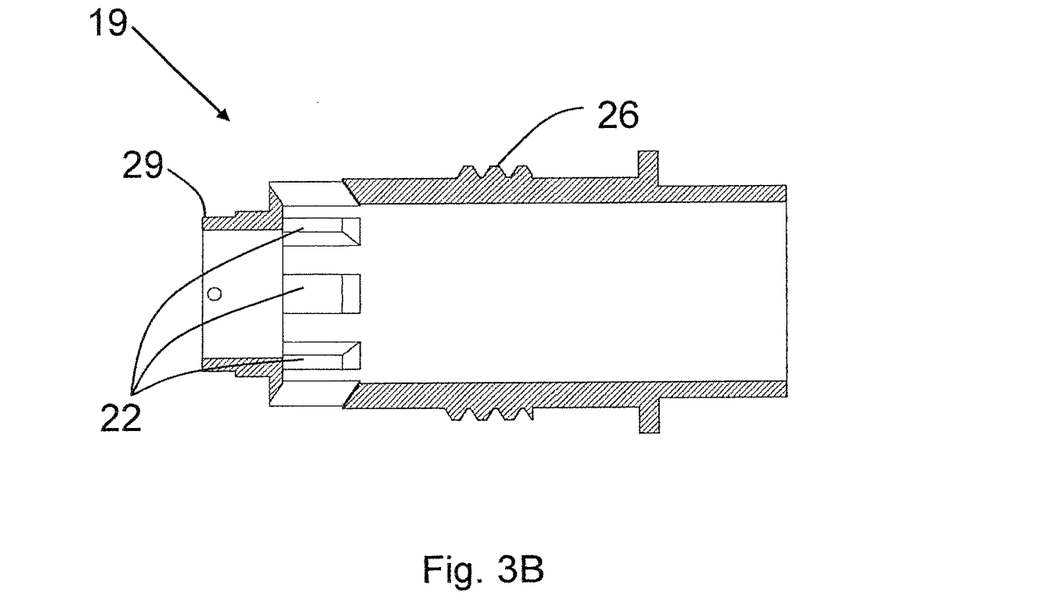
FIG. 3B is a cross sectional view of the center tube in FIG. 3A.

FIGS. 3A and 3B shows the center tube 19, with the orifices 22, the external screw thread 26 and the first end 29. In this embodiment, the first end 29 is open, but when mounted in the valve (see FIG. 4), the first end 29 rests against the end cap 24, and the end cap 24 closes and seals the opening in the first end 29 of the center tube 19, so that no fluid can pass through the first end of the center tube 19. Fluid can only pass through the orifices 22.

Figure 4:
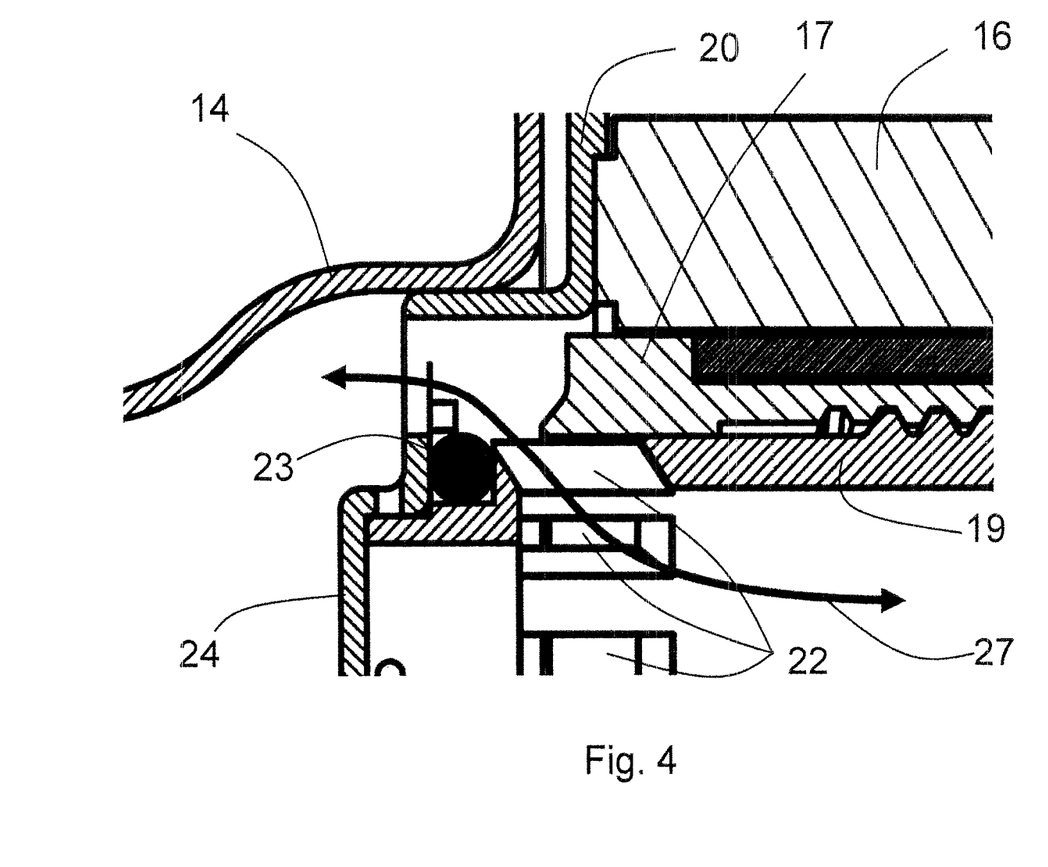
FIG. 4 shows the flow through the center tube when in open position.

FIG. 4 shows flow 27 of fluid through the orifices 22. The flow is illustrated by a double arrow 27 going through one of the orifices 22 in the sidewall of the center tube 19; of course, the flow goes simultaneous through all orifices. The arrow 27 is a double arrow, indicating that the valve is a bi-flow valve. The flow 27 through the orifices 22 will partly take place obliquely to and away from or towards the axial extension of the center tube 19.

For low capacity valves, or valves working with low differential pressures between inlet and outlet, an axially sealed valve could be of interest. This could simplify the design even further, but the valve would in this case not be balanced, and would be limited to a certain differential pressure, depending on the valve capacity.

As the closing element 17 in this embodiment is rotating, when opening and closing the valve, this can cause the closing element 17 to lock in either end, as the torque from the motor acts as a pre-tension of the closing element 17 to the center tube 19. This is similar to the torque applied when tighten a nut on a bolt connection. After this has been done, an equal amount of torque has to be applied in order to loosen the nut again. And in the case of the valve according to the invention, the total amount of torque applied to the screw thread is the torque from the motor minus friction, minus flow forces and minus differential pressure forces. When opening the orifices, the torque to be applied to the closing element 17 is the initial torque applied when closing plus friction, plus flow force and plus differential pressure forces.

These forces are theoretically the same, so the valve should be able to open again, but with zero safety. In order to minimize this pre-tension of the screw thread connection, an end stop solution is implemented, making sure that tension of the screw thread does not occur.

Figure 5:
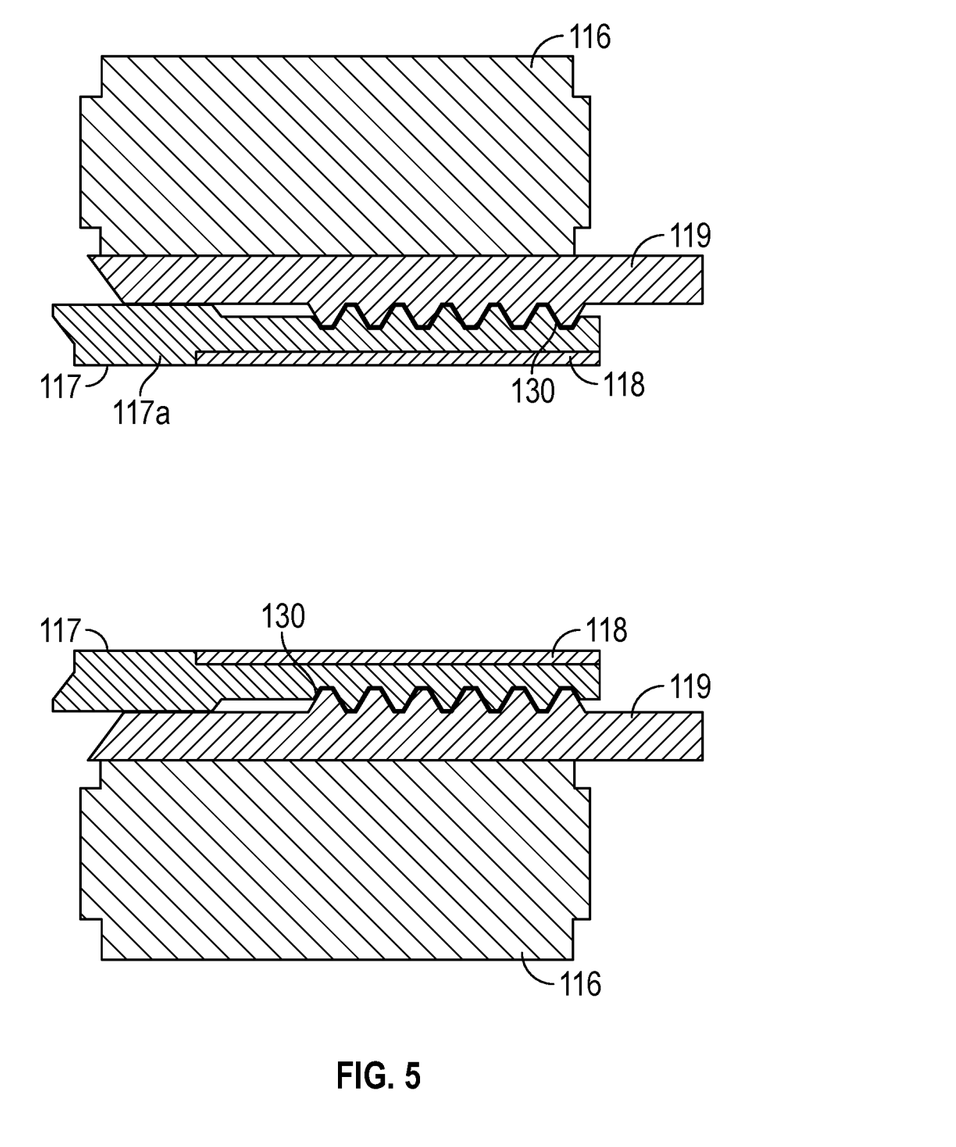
FIG. 5 is a cross sectional view of an embodiment of the stationary element, closing element and center tube in accordance with the present disclosure.

FIG. 5 shows closing element 117 positioned on the inner side of center tube 119. The closing element 117 comprises a closing element core 117a and a magnet 118. In this embodiment, the stationary element 116 is positioned along an outer circumference of the center tube 119. The closing element 17 is able to engage the center tube 19 by way of the inner surface of the center tube 119 being provided with a screw thread 130.

Figure 6:
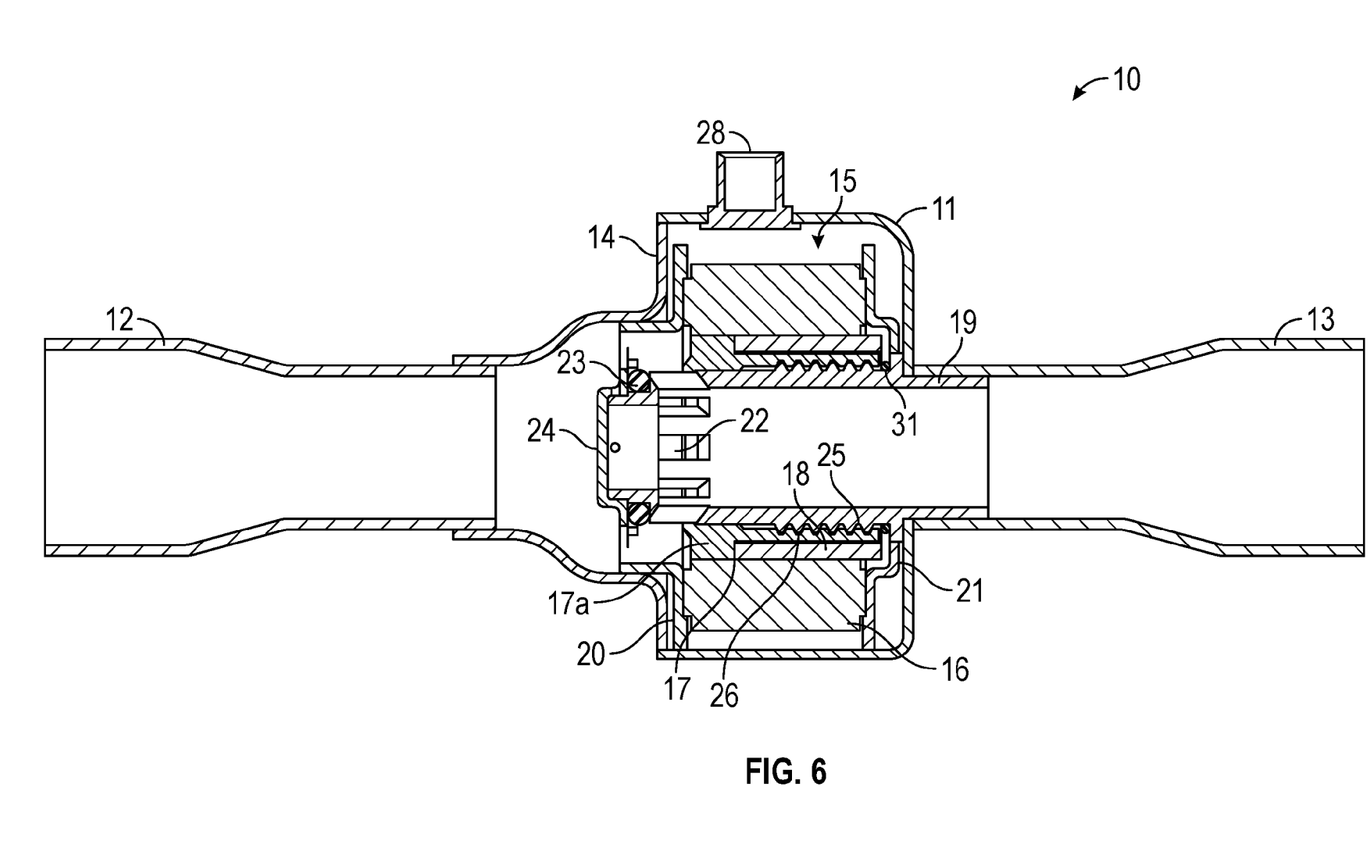
FIG. 6 is a cross sectional view of an embodiment of a valve in an open position in accordance with the present disclosure.

FIG. 6 shows a cross sectional view of an embodiment of a valve in an open position in accordance with the present disclosure. This embodiment includes a biasing element 31, which provides a torque on closing element 17.

Through prototyping, it has been found that alignment of closing element 17 with regard to center tube 19 has a high influence on what forces may act on the different parts of the valve, when the valve is operating. If the closing element 17 and the center tube 19 are not tightly aligned and controlled, any forces occurring due to flow and pressure force and difference in alignment between the closing element 17 and the center tube 19, can twist or displace the parts in relation to each other, thereby inducing significant frictional forces, limiting the performance of the valve. This might be avoided by making sure the parts are axially aligned with each other.

The top and bottom flanges 20, 21 of the actuator 15 are normally stamped parts, and maybe with deep-drawn features. The flanges 20, 21 act as connection between the stationary element 16 and the center tube 19. This connection has to be made within a few hundreds of a millimeter of tolerance in order to insure correct function and performance of the valve. By using manufacturing precision of the flanges 20, 21, a custom flange can be designed, which custom flange will fit the stationary element 16, using their interface, and adapt to the geometry of the mating valve part, thereby transferring the fine tolerance needed to valve parts, at low cost and at low complexity.

The closing element 17 of the actuator 15 consists of a ring magnet 18 and a closing element core 17a. The closing element core 17a typically is made of aluminum to reduce moment of inertia. In a typical stepper motor where the closing element is a rotor, the closing element would also have a rotor axle. However, in the valve of the invention the center tube 19 works as the rotor axle. Also here a fine tolerance is needed, to ensure that the closing element will rotate and move axially around and along the center tube 19.

By replacing the closing element core 17a with a special turned part in a screw thread compatible material, and mating the magnet 18 with this part, the closing element part of the valve will be manufactured with the necessary tolerances, and with need for no further treatment.

The center tube 19 is the most complex of the non-motor components. It's also the only real complex part apart from the motor. The part has the function as the shaft in the standard motor, but here also as orifice, sealing fixation etc. The choice of technology for this part is very critical. As by now, 3 main solutions have been considered.

A first solution is to manufacture the center tube by metal injection molding. The fairly small size and the geometry of the center tube make the center tube 19 suitable for metal injection molding. Metal injection molding may reduce costs because of limiting the amount of metal used for manufacturing the center tube and/or by minimizing subsequent machining operations to the parts where a certain geometry or surface texture is needed.

A second solution is to use a machined standard tube, as all the geometries and features lies along the same axis, the use of a machined standard tube could be quite price competitive. A machined standard tube also reduces the stress on the center tube as any differential pressure over the valve only act radially outwards or inwards on the center tube, not causing any significant bending stresses part of the center tube 19.

A third solution is to manufacture the center tube by deep drawing and machining.

The connection 28 can be of copper, stainless steel or bimetal. To reduce parts and complexity of parts, the connection 28 preferable is implemented in the valve housing 11, so the connection 28 acts as both connector and enclosure of the valve. By using bi-metal parts, the parts can be laser-welded together with the valve, and still be soldable.

The invention is described with reference to a specific embodiment as shown in the figures. Other embodiments with the scope of the claims may be derived, and the embodiment shown in the figures is not to be construed as a limitation to the scope of the claims.

What is claimed is:

1. An axial valve comprising an actuator, the actuator comprising a stationary element and a closing element,
   the valve having a substantially longitudinal extension along a prevailing flow direction of fluid through the valve,
   the valve comprising a center tube placed axially in relation to an axial extension of the stationary element,
   the center tube being in a fixed position relative to the stationary element and placed parallel to the longitudinal extension of the valve,
   and fluid intended for flowing through the valve, through the center tube, said center tube comprises one or more orifices for fluid passage,
   the closing element being placed axially to an axial extension of the center tube and at least partly extending along a sidewall of the center tube,
   the closing element being movable axially along the center tube between a first position, where the closing element closes the one or more orifices, thereby not allowing fluid to pass the orifices, and a second position where the one or more orifices are open, thus allowing fluid to pass the orifices,
      wherein the actuator is a stepper motor, the stationary element is a stator, and the closing element is a rotor, and
      wherein rotational movement of the closing element generates a linear movement of the closing element.

2. The axial valve according to claim 1, wherein the center tube is fixed to the stationary element, and wherein the center tube is supported from the stationary element, so that the axial extension of the center tube is aligned with an axis of the stationary element.

3. The axial valve according to claim 1, wherein a first end of the center tube is fixed to a first flange, and a second end of the center tube is fixed to a second flange, wherein one end of the stationary element is fixed to the first flange, and another end of the stationary element is fixed to the second flange, so that the axial extension of the center tube is aligned with an axis of the stationary element by both the center tube and the stationary element being fixed to the same first flange and the same second flange, respectively.

4. The axial valve according to claim 1, wherein the closing element is positioned along a sidewall of the center tube, and wherein the closing element is movably guided by the center tube, and wherein the closing element is supported by the center tube.

5. The axial valve according to claim 1, wherein the one or more orifices of the center tube are positioned along a sidewall of the center tube, allowing fluid to pass to or from the center tube through the sidewall of the center tube, when the closing element is not in the first position.

6. The axial valve according to claim 1, wherein the one or more orifices of the center tube are positioned in a first end of the center tube, allowing fluid to pass to or from the center tube through the first end of the center tube by passing from outside the center tube to an inside of the center tube, or from inside the center tube to the outside of the center tube, when the closing element is not in the first position.

7. The axial valve according to claim 1, wherein the closing element is tubular, wherein an axial extension of the closing element extends parallel to the axial extension of the center tube, and wherein the closing element extend along a sidewall of the center tube, and wherein the closing element is both rotatable and axially movable along the sidewall of the center tube.

8. The axial valve according to claim 1, wherein the center tube is provided with one or more orifices along the sidewall of the center tube, and wherein a sealing, at least when the closing element is in the first position, is provided between the sidewall surface of the center tube and the sidewall surface of the closing element, said sidewall of the center tube and said sidewall of the closing element facing each other, at least when the closing element is in the first position.

9. The valve according to claim 1, where one end of the center tube is supported by a first flange extending from the center tube, and another end of the center tube is supported by a second flange extending from the center tube, and where the closing element is positioned between the first flange and a bottom flange, and where the stationary element also, as is the case with the center tube, is supported by the first flange and the second flange.

10. The valve according to claim 1, wherein the closing element is positioned between the center tube and the stationary element, wherein the closing element is supported by an outer sidewall of the center tube, and wherein the stationary element is positioned along an outer circumference of the closing element.

11. The valve according to claim 1, wherein the closing element is positioned inside the center tube, wherein the closing element is supported along an inner sidewall of the center tube, and wherein the stationary element is positioned along an outer circumference of the center tube.

12. The axial valve according to claim 1, where the closing element is constantly biased towards the first position by a biasing element with a biasing force, and wherein the biasing element is capable of moving the closing element to the first position, where the closing element closes the one or more orifices of the center tube, thereby not allowing fluid to pass the orifices, in case the operating force of a stepper motor decrease to a value less than the biasing force.

13. The axial valve according to claim 1, where the closing element is constantly biased towards the second position by a biasing element with a biasing force, and wherein the biasing element is capable of moving the closing element to the second position, where the closing element opens the one or more orifices of the center tube, thereby allowing fluid to pass the orifices, in case the operating force of a stepper motor decrease to a value less than the biasing force.

14. A vapor compression cycle system with at least one axial valve along piping of the vapor compression cycle system, said at least one axial valve of the refrigeration system being a valve according to claim 1.

15. The axial valve according to claim 1, wherein the closing element extends along an inner surface of the sidewall of the center tube, so that the closing element extends along an inner surface of the center tube.

16. The axial valve according to claim 15, wherein the inner surface of the center tube is provided with a screw thread, and the outer surface of the closing element is provided with a screw thread, said screw thread of the center tube and said screw thread of the closing element being mutually engaged, and wherein a rotational movement of the closing element is transformed to also an axial movement of the closing element in relation to the center tube.

17. The axial valve according to claim 1, wherein the closing element extends along an outer surface of the sidewall of the center tube, so that the closing element extends along an outer surface of the center tube.

18. The axial valve according to claim 17, wherein the outer surface of the center tube is provided with a screw thread, and the inner surface of the closing element is provided with a screw thread, said screw thread of the center tube and said screw thread of the closing element being mutually engaged, and wherein a rotational movement of the closing element is transformed to also an axial movement of the closing element in relation to the center tube.

* * * * *